(12) United States Patent
Nakada et al.

(10) Patent No.: US 11,495,863 B2
(45) Date of Patent: Nov. 8, 2022

(54) POROUS POLYIMIDE FILM, SECONDARY BATTERY SEPARATOR, AND SECONDARY BATTERY

(71) Applicant: FUJIFILM Business Innovation Corp., Tokyo (JP)

(72) Inventors: Kosuke Nakada, Kanagawa (JP); Hidekazu Hirose, Kanagawa (JP); Yasunobu Kashima, Kanagawa (JP); Kosaku Yoshimura, Kanagawa (JP); Tomoya Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 323 days.

(21) Appl. No.: 16/853,677

(22) Filed: Apr. 20, 2020

(65) Prior Publication Data

US 2021/0202925 A1  Jul. 1, 2021

(30) Foreign Application Priority Data

Dec. 27, 2019  (JP) .............................. JP2019-238727

(51) Int. Cl.
  *H01M 50/411* (2021.01)
  *H01M 10/0525* (2010.01)

(52) U.S. Cl.
  CPC ..... *H01M 50/411* (2021.01); *H01M 10/0525* (2013.01)

(58) Field of Classification Search
  CPC .................................................. H01M 50/411
  See application file for complete search history.

(56) References Cited

U.S. PATENT DOCUMENTS

| 7,303,811 | B2 * | 12/2007 | Yao | ........................... | B32B 5/18 |
| | | | | | 428/315.7 |
| 2003/0018094 | A1 * | 1/2003 | Ohya | ..................... | B29C 41/28 |
| | | | | | 521/50 |
| 2012/0045626 | A1 * | 2/2012 | Inokuma | ................ | D04H 3/009 |
| | | | | | 156/324 |
| 2014/0217013 | A1 * | 8/2014 | Sato | .................... | H01M 50/494 |
| | | | | | 428/398 |

FOREIGN PATENT DOCUMENTS

| JP | 2011060539 | 3/2011 |
| JP | 2017128691 | 7/2017 |

* cited by examiner

*Primary Examiner* — Ula C Ruddock
*Assistant Examiner* — Thomas H. Parsons
(74) *Attorney, Agent, or Firm* — JCIPRNET

(57) ABSTRACT

A porous polyimide film has plural pores, in which an average flattening of the plural pores is within a range of 0.1 to 0.7, a coefficient of variation of a distance between adjacent pores is within a range of 0.10 to 0.40, and a front surface and a back surface communicate with each other through the plural pores.

9 Claims, 5 Drawing Sheets

POROUS POLYIMIDE FILM, SECONDARY BATTERY SEPARATOR, AND SECONDARY BATTERY

CROSS-REFERENCE TO RELATED APPLICATIONS

This application is based on and claims priority under 35 USC 119 from Japanese Patent Application No. 2019-238727 filed Dec. 27, 2019.

BACKGROUND

(i) Technical Field

The present invention relates to a porous polyimide film, a secondary battery separator, and a secondary battery.

(ii) Related Art

A polyimide resin is a material having excellent characteristics of mechanical strength, chemical stability, heat resistance, and the like, and a polyimide film having these characteristics is attracting attention.

In particular, porous polyimide films are applied to use applications such as secondary batteries (a separator of a lithium-ion secondary battery, a retention part for a solid electrolyte in an all-solid-state battery, and the like) in some cases.

For example, JP2011-060539A discloses a secondary battery separator including a porous polyimide resin film in which a porosity is 60% or more, pores have a three-dimensional regular array structure, and the pores communicate with each other through communication pores.

In addition, JP2017-128691A discloses a porous film made of a polyimide resin, the porous film including a plurality of pores having a distance in a plane direction longer than a distance in a thickness direction, in which a front surface and a back surface are formed in a state of communicating with each other by connection of the plurality of pores.

SUMMARY

In porous polyimide films, a film strength may be reduced or an air permeability may be reduced in a case where a porosity is high depending on shapes of pores (specifically, flattening), coefficients of variation of a distance between adjacent pores, and the like.

Specifically, for example, a film strength may be reduced in a case of a porous polyimide film in which pores are circular and pores are regularly arranged. In addition, an air permeability may be reduced in a case of a porous polyimide film in which pores are flat and a coefficient of variation of a distance between adjacent pores is too large.

Aspects of non-limiting embodiments of the present disclosure relate to a porous polyimide film that has an excellent tensile breaking strength and air permeability as compared to a case in which an average flattening is less than 0.1 and a coefficient of variation of a distance between adjacent pores is less than 0.10, or a case in which an average flattening is 0.1 to 0.7 and a coefficient of variation of a distance between adjacent pores is more than 0.40.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a porous polyimide film having a plurality of pores, in which an average flattening of the plurality of pores is 0.1 to 0.7, a coefficient of variation of a distance between adjacent pores is 0.10 to 0.40, and a front surface and a back surface communicate with each other by connection of the plurality of pores.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described in detail.

Porous Polyimide Film

A porous polyimide film according to this exemplary embodiment has a plurality of pores, in which an average flattening of the plurality of pores is 0.1 to 0.7, a coefficient of variation of a distance between adjacent pores is 0.10 to 0.40, and a front surface and a back surface communicate with each other by connection of the plurality of pores.

The porous polyimide film according to this exemplary embodiment has the above-described configuration, and therefore has excellent tensile breaking strength and air permeability. The reason for this is not clear but is presumed as follows.

In the porous polyimide film according to this exemplary embodiment, an average flattening of the plurality of pores is 0.1 to 0.7, and a coefficient of variation of a distance between adjacent pores is 0.10 to 0.40. Therefore, it is considered that flat pores are arranged with an appropriate irregularity.

It is considered that, in a case where pores are arranged as described above, a thick skeleton part made of resin (that is, polyimide) is formed between pores, and this thick skeleton part functions as a beam structure in a thickness direction of the porous polyimide film.

As a result, it is presumed that a porous polyimide film having excellent tensile breaking strength is obtained even in a case where a porosity is high.

Furthermore, it is presumed that in a case where pores are arranged as described above, and a front surface and a back surface communicate with each other by connection of plurality of pores, communication parts of the front surface and the back surface are sufficiently obtained, and thereby air permeability becomes high in the porous polyimide film according to this exemplary embodiment.

Pores

The porous polyimide film according to this exemplary embodiment has a plurality of pores.

The pores of the porous polyimide film according to this exemplary embodiment will be described with reference to the drawings.

Figure 1:
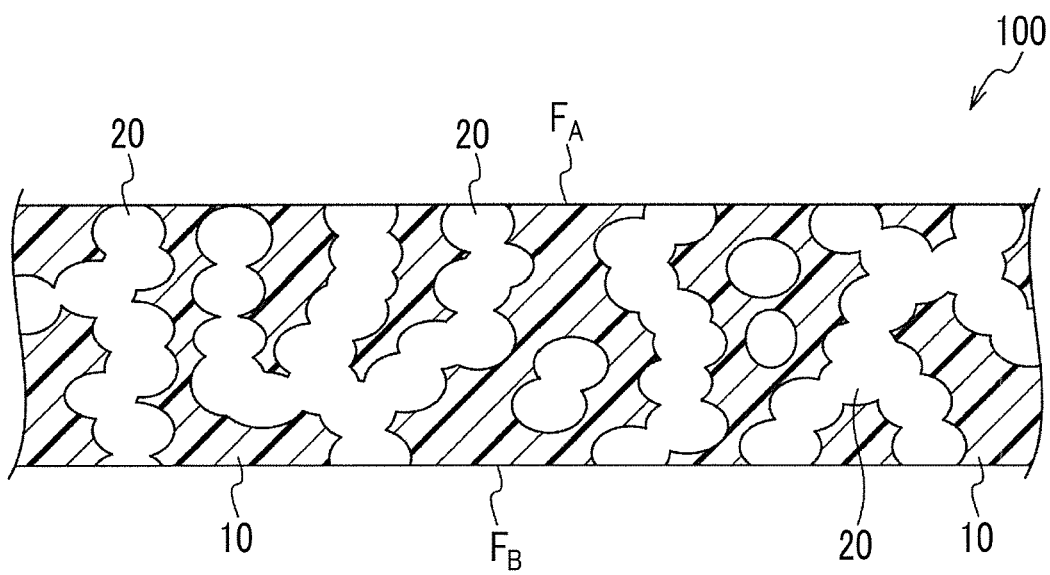
FIG. 1 is a schematic diagram showing an example of a cross section of a porous polyimide film of this exemplary embodiment.

FIG. 1 is a schematic diagram showing a cross section in a thickness direction of the porous polyimide film according to this exemplary embodiment.

As shown in FIG. 1, a porous polyimide film 100 is configured of a skeleton part 10 made of a resin (that is, polyimide), and a plurality of pores 20 present as a dispersed state in the skeleton part 10.

In addition, most of the plurality of pores 20 are connected to each other, thereby forming a state in which a front surface FA and a back surface FB communicate with each other.

Average Flattening

In the porous polyimide film according to this exemplary embodiment, an average flattening of the plurality of pores is 0.1 to 0.5.

An average flattening of the plurality of pores is, for example, preferably 0.2 to 0.7 and more preferably 0.2 to 0.6 from the viewpoint of improving strength of the film.

Coefficient of Variation of Distance Between Adjacent Pores

In the porous polyimide film according to this exemplary embodiment, a coefficient of variation of a distance between adjacent pores is 0.10 to 0.40.

A coefficient of variation of a distance between adjacent pores is, for example, preferably 0.12 to 0.40 and more preferably 0.15 to 0.40 from the viewpoint of improving strength of the film.

A flattening and a distance between adjacent pores will be described with reference to the drawings.

A flattening and a distance between adjacent pores are obtained from values obtained by observing and measuring a cross section of the porous polyimide film in a thickness direction as shown in FIG. 1 with a scanning electron microscope (SEM).

In addition, as shown in FIG. 1, pores in the porous polyimide film are connected to each other, but a flattening and a distance between adjacent pores are obtained while regarding each pore as an independent pore.

Figure 2A:
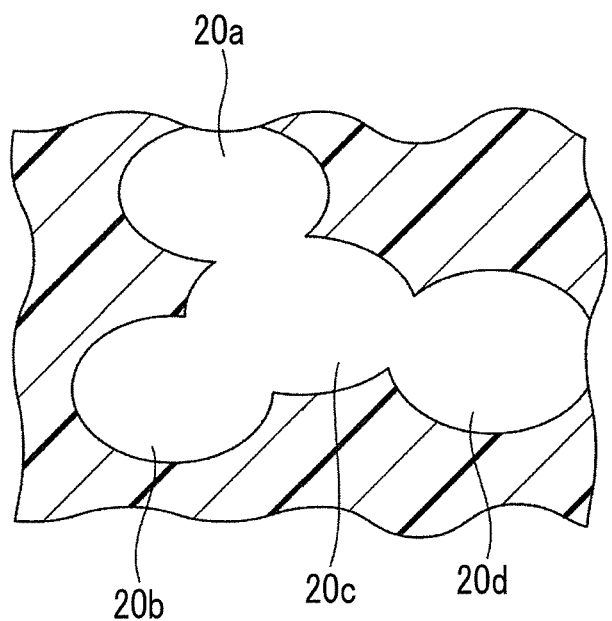
FIG. 2A is a schematic diagram for illustrating adjacent pores and a distance between the adjacent pores.
Figure 2B:
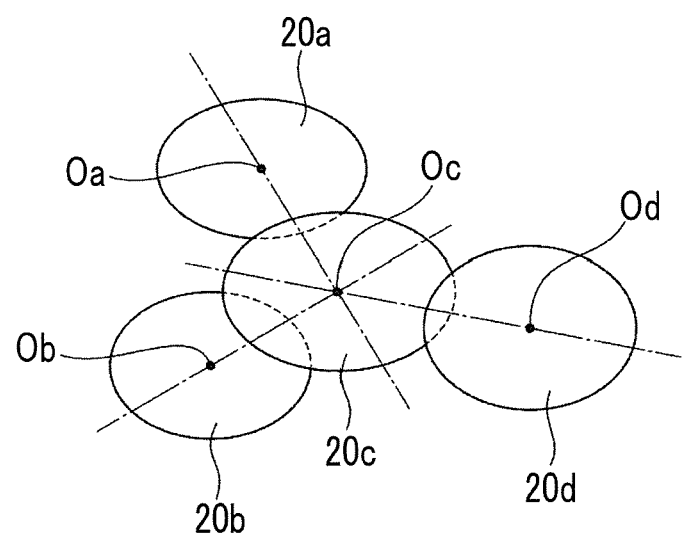
FIG. 2B is a schematic diagram for illustrating adjacent pores and a distance between the adjacent pores.

For example, in a case where four pores 20a, 20b, 20c, and 20d are in a form of being connected to each other as shown in FIG. 2A, it is assumed that there are four pores 20a, 20b, 20c, and 20d which are respectively independent from an outer edge of the respective pores as shown in FIG. 2B.

In a case of using a certain pore X as a reference pore, an adjacent pore thereof refers to an certain pore Y in which, when a straight line L is drawn from the center of the pore X to the center of the certain pore Y, other pores Z are not in contact with the straight line L, and a distance from the center of the pore X to the center of the pore Y is within three times an average major axis. A distance between adjacent pores refers to a distance from the center of the pore X to the center of the pore Y.

More specifically, in FIG. 2B, for example, in a case of using the pore 20c (corresponding to the pore X) as a reference pore, adjacent pores thereof refer to the pores 20a, 20b, and 20d (each corresponding to the pore Y) which are in contact with a straight line when the straight line (corresponding to the straight line L) is drawn from a center Oc of the pore 20c, in which other pores (corresponding to the pores Z) are not in contact with the straight line. In FIG. 2B, the pores 20c are in contact with the pores 20a, 20b, and 20d, and a skeleton part made of resin may be present between the pores 20c and the pores 20a, 20b, and 20d. In a case where there is a skeleton part made of resin is present between the pores 20c and the pores 20a, 20b, and 20d, a distance from the center Oc of the pores 20c to respective centers Oa, Ob, and Od of the pores 20a, 20b, and 20d needs to within three times an average pore diameter.

In addition, a distance between adjacent pores refers to, for example, a distance between the center Oc of the pore 20c, and the respective centers Oa, Ob, and Od of the pores 20a, 20b, and 20d which are adjacent pores in a case of using the pore 20c as a reference pore.

In FIG. 2B, in a case of using the pore 20a as a reference pore, an adjacent pore thereof is only the pore 20c, and the pores 20b and 20d do not correspond to adjacent pores.

Subsequently, observation and measurement by a scanning electron microscope (SEM) will be described in detail.

First, the porous polyimide film is cut out in a thickness direction to prepare a sample for measurement having a cut surface as a measurement surface. Then, this sample for measurement is observed and measured by VE SEM manufactured by KEYENCE CORPORATION using image processing software that is originally installed software. Measurement of a major axis and a minor axis of a pore is performed on 100 pores in the cross section of the sample for measurement. In addition, measurement of a distance between adjacent pores is performed on 200 adjacent pores in the cross section of the sample for measurement.

A major axis of a pore refers to a length of a long side of a circumscribed rectangle of the pore, and a minor axis of a pore refers to a length of a short side of a circumscribed rectangle of the pore.

Flattening is obtained from Equation (I) based on values of the major axes and minor axes obtained by the above measurement. Then, an average value of oblateness of 100 pores is defined as an "average flattening" in this exemplary embodiment.

$$\text{Flattening} = (\text{major axis} - \text{minor axis})/\text{major axis} \qquad \text{Equation (I)}$$

In addition, based on values of the distances between adjacent pores (n: 200 locations) obtained by the above measurement, and an average value of the values of the distances between adjacent pores obtained therefrom, a coefficient of variation of the distance between adjacent pores is obtained. Specifically, an average value of values of the distances between adjacent pores, the values of the respective distances between adjacent pores (n: 200 locations), and a difference therebetween (that is, a "deviation") are squared, an average value of the sum of the obtained values is calculated, a positive square root of this average value is obtained (that is, "one-half squared"), the obtained standard deviation is divided by the average value, and thereby a coefficient of variation of the distances between adjacent pores is obtained.

Porosity

A porosity of the porous polyimide film according to this exemplary embodiment is, for example, preferably 40% to 90%, and more preferably 45% to 85% from the viewpoint of ease of application to a secondary battery separator.

In a case where a porosity is within the above range, a deterioration in cycle characteristics tends to be inhibited in a case where the porous polyimide film according to this exemplary embodiment is applied to a secondary battery separator.

A porosity of the porous polyimide film is obtained from an apparent density and a true density of the porous polyimide film.

An apparent density d is a value obtained by dividing a mass (g) of the porous polyimide film by a volume (cm$^3$) of the porous polyimide film including pores. The apparent density d may be obtained by dividing a mass per unit area (g/m$^2$) of the porous polyimide film by a thickness (μm) of the porous polyimide film.

A true density ρ is a value obtained by dividing a mass (g) of the porous polyimide film by a volume (cm$^3$) of the porous polyimide film excluding pores (that is, a volume of only the skeleton part made of resin).

A porosity of the porous polyimide film is calculated by Equation (II).

$$\{\text{Porosity (\%)} = \{1 - (d/\rho)\} \times 100 = [1 - \{(w/t)/\rho)\}] \times 100 \quad \text{Equation (II)}$$

d: Apparent density (g/cm$^3$) of porous polyimide film
ρ: True density (g/cm$^3$) of porous polyimide film
w: Mass (g/m$^2$) per unit area of porous polyimide film
t: Thickness (μm) of porous polyimide film Average Major Axis An average major axis of plurality of pores of the porous polyimide film according to this exemplary embodiment is, for example, preferably 50 nm to 1500 nm and more preferably 50 nm to 1000 nm from the viewpoint of applicability to a secondary battery separator (more specifically, inhibition of lithium dendrites in a lithium-ion secondary battery when the porous polyimide film is applied to a secondary battery separator).

An average major axis of the plurality of pores is an average value of major axises of 100 pores which is obtained by observing and measuring the cross section of the porous polyimide film in a thickness direction by the above-mentioned scanning electron microscope (SEM).

Tensile Breaking Strength

A tensile breaking strength of the porous polyimide film according to this exemplary embodiment is, for example, preferably 20 MPa or more, more preferably 25 MPa or more, and even more preferably 30 MPa or more.

In particular, the above-mentioned tensile breaking strength is, for example, preferably achieved in a porous polyimide film in which a porosity is within a range of 50% to 85%.

In a case where a tensile breaking strength is within the above range, excellent mechanical strength tends to be obtained in a case where the porous polyimide film according to this exemplary embodiment is applied to a secondary battery separator.

The tensile breaking strength is measured as follows.

First, a striped sample for measurement having a width of 5 mm, a length of 100 mm, and a thickness of 100 μm is produced.

Using a STROGRAPH VE-1D (Toyo Seiki Seisaku-sho, Ltd.), the striped sample for measurement is pulled under the following conditions, and a tensile breaking strength is calculated from a stress (load/cross-sectional area) at which the sample for measurement breaks.

Distance between chucks: 50 mm
Pulling speed: 500 mm/min
Temperature: 23° C.
Relative humidity: 55%

Air Permeability

An air permeability of the porous polyimide film according to this exemplary embodiment is, for example, preferably 300 seconds/100 mL or less, more preferably 270 seconds/100 mL or less, and even more preferably 250 seconds/100 mL or less.

In a case where an air permeability is within the above range, a deterioration in cycle characteristics tends to be inhibited in a case where the porous polyimide film according to this exemplary embodiment is applied to a secondary battery separator.

An air permeability of the porous polyimide film according to this exemplary embodiment is measured according to an air permeability test method of the Gurley method (JIS P 8117:2009).

Skeleton Part Made of Resin

The porous polyimide film according to this exemplary embodiment has a skeleton part containing polyimide.

Polyimide contained in the skeleton part made of resin is not particularly limited. In addition, the skeleton part made of resin may contain other components in addition to polyimide within a range not impairing the effects such as excellent tensile breaking strength and air permeability.

Examples of other components include other additives contained in a polyimide precursor solution to be described later.

Average Film Thickness

An average film thickness of the porous polyimide film according to this exemplary embodiment is not particularly limited and may be selected depending on use applications.

An average film thickness of the porous polyimide film may be, for example, 10 μm to 1000 μm. An average film thickness of the porous polyimide film may be 20 μm or more, or may be 30 μm or more. In addition, an average film thickness of the porous polyimide film may be 500 μm or less, or may be 400 μm or less.

An average film thickness of the porous polyimide film is obtained by observing a cross section in a thickness direction at ten locations with the scanning electron microscope (SEM), measuring a film thickness at each observation point from ten SEM images, and averaging the obtained ten measured values (film thickness).

Method for Producing Porous Polyimide Film

Hereinafter, a method for producing the porous polyimide film according to this exemplary embodiment will be described.

The porous polyimide film according to this exemplary embodiment is, for example, preferably produced through the following steps.

That is, there are a step in which a polyimide precursor solution containing a polyimide precursor, resin particles, and a solvent is applied to a substrate to form a coating film, and then the coating film is dried, and thereby a film containing the polyimide precursor and the resin particles is formed (hereinafter referred to as the first step); a step in which the particles are removed from the film (hereinafter referred to as the second step); and a step in which the film is heated to imidize the polyimide precursor in the film (hereinafter referred to as the third step).

Hereinafter, each step will be described.

First Step

In the first step, a polyimide precursor solution containing a polyimide precursor, resin particles, and a solvent is applied to a substrate to form a coating film, and then the coating film is dried, and thereby a film containing the polyimide precursor and the resin particles is formed.

Polyimide Precursor Solution

Polyimide Precursor

The polyimide precursor solution used in the first step contains a polyimide precursor.

The polyimide precursor is, for example, preferably a resin having a repeating unit represented by General Formula (I).

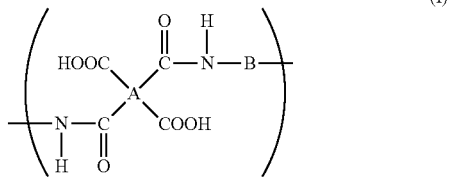

In General Formula (I), A represents a tetravalent organic group, and B represents a divalent organic group.

In General Formula (I), the tetravalent organic group represented by A is a residue obtained in a case where four carboxyl groups have been removed from a tetracarboxylic dianhydride as a raw material.

Meanwhile, the divalent organic group represented by B is a residue obtained in a case where two amino groups have been removed from a diamine compound as a raw material.

That is, the polyimide precursor having the repeating unit represented by General Formula (I) is a polymer of the tetracarboxylic dianhydride and the diamine compound.

Examples of tetracarboxylic dianhydrides include any compound of aromatic and aliphatic compounds, but for example, an aromatic compound is preferable. That is, in General Formula (I), the tetravalent organic group represented by A is, for example, preferably an aromatic organic group.

Examples of aromatic tetracarboxylic dianhydrides include pyromellitic dianhydride, 3,3',4,4'-benzophenone tetracarboxylic dianhydride, 3,3',4,4'-biphenylsulfone tetracarboxylic dianhydride, 1,4,5,8-naphthalene tetracarboxylic dianhydride, 2,3,6,7-naphthalene tetracarboxylic dianhydride, 3,3',4,4'-biphenyl ether tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furan tetracarboxylic dianhydride, 4,4'-bis (3,4-dicarboxyphenoxy) diphenyl sulfide dianhydride, 4,4'-bis (3,4-dicarboxyphenoxy) diphenyl sulfone dianhydride, 4,4'-bis(3,4-dicarboxphenoxy)diphenylpropane dianhydride, 3,3',4,4'-perfluoroisopropylidene diphthalic dianhydride, 3,3',4,4'-biphenyltetracarboxylic dianhydride, 2,3,3',4'-biphenyltetracarboxylic dianhydride, bis(phthalic acid) phenyl phosphine oxide dianhydride, p-phenylene-bis (triphenylphthalic acid) dianhydride, m-phenylene-bis (triphenylphthalic acid) dianhydride, bis(triphenylphthalic acid)-4,4'-diphenyl ether dianhydride, bis(triphenylphthalic acid)-4,4'-diphenylmethane dianhydride, and the like.

Examples of aliphatic tetracarboxylic dianhydrides include aliphatic or alicyclic tetracarboxylic dianhydride such as butane tetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tricarboxycyclopentyl acetic dianhydride, 3,5,6-tricarboxynorbornane-2-acetic dianhydride, 2,3,4,5-tetrahydrofuran tetracarboxylic dianhydride, 5-(2,5-dioxotetrahydrofuryl)-3-methyl-3-cyclohexene-1,2-di carboxylic dianhydride, and bicyclo[2,2,2]-oct-7-ene-2,3,5,6-tetracarboxylic dianhydride; an aliphatic tetracarboxylic dianhydride having an aromatic ring such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione; and the like.

Among the above examples, as tetracarboxylic dianhydrides, for example, the aromatic tetracarboxylic dianhydride is preferable, and specifically, for example, pyromellitic dianhydride, 3,3',4,4'-biphenyl tetracarboxylic dianhydride, 2,3,3',4'-biphenyl tetracarboxylic dianhydride, 3,3',4,4'-biphenyl ether tetracarboxylic dianhydride, and 3,3',4,4'-benzophenone tetracarboxylic dianhydride are preferable, pyromellitic dianhydride, 3,3',4,4'-biphenyl tetracarboxylic dianhydride, and 3,3',4,4'-benzophenone tetracarboxylic dianhydride are more preferable, and 3,3',4,4'-biphenyl tetracarboxylic dianhydride is particularly preferable.

A tetracarboxylic dianhydride may be used alone or in combination of two or more kinds thereof.

In addition, in a case of the combination use of two or more kinds thereof, each of an aromatic tetracarboxylic dianhydride or an aliphatic tetracarboxylic acid may be used in combination, or an aromatic tetracarboxylic dianhydride and an aliphatic tetracarboxylic dianhydride may be combined to be used.

Meanwhile, a diamine compound is a diamine compound having two amino groups in a molecule structure. Examples of diamine compounds include any compound of aromatic and aliphatic compounds, but for example, an aromatic compound is preferable. That is, in General Formula (I), the divalent organic group represented by B is, for example, preferably an aromatic organic group.

Examples of diamine compounds include aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenyl sulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl) biphenyl, 2,2-bis[4-(4-aminophenoxy)phenyl] propane, 2,2-bis[4-(4-aminophenoxy)phenyl] hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenyleneisopropylidene) bisaniline, 4,4'-(m-phenyleneisopropylidene)bisaniline, 2,2'-bis[4-(4-amino-2-trifluoromethylphenoxy)phenyl] hexafluoropropane, and 4,4'-bis[4-(4-amino-2-trifluoromethyl)phenoxy]-octafluorob iphenyl; an aromatic diamine having two amino groups bonded to an aromatic ring such as diaminotetraphenylthiophene and a hetero atom other than the nitrogen atom of the amino group; aliphatic diamines and alicyclic diamines such as 1,1-meta-xylylene diamine, 1,3-propane diamine, tetramethylene diamine, pentamethylene diamine, octamethylene diamine, nonamethylene diamine, 4,4-diaminoheptamethylene diamine, 1,4-diaminocyclohexane, isophorone diamine, tetrahydrodicyclopentadienylenediamine, hexahydro-4,7-methanoindanylenedimethylene diamine, tricyclo[6,2,1, 0$^{2.7}$]-undecylenedimethyldiamine, and 4,4'-methylenebis (cyclohexylamine); and the like.

Among the above examples, as diamine compounds, for example, the aromatic diamine compound is preferable, and specifically, for example, p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, and 4,4'-diaminodiphenyl sulfone are preferable, and 4,4'-diaminodiphenyl ether and p-phenylenediamine is particularly preferable.

A diamine compound may be used alone or in combination of two or more kinds thereof. In addition, in a case of the combination use of two or more kinds thereof, each of an aromatic diamine compound and an aliphatic diamine compound may be used in combination, or an aromatic diamine compound and an aliphatic diamine compound may be combined to be used.

A weight-average molecular weight of the polyimide precursor used in this exemplary embodiment is, for example, preferably 5000 to 300000, and more preferably 10000 to 150000.

A weight-average molecular weight of the polyimide precursor is measured by a gel permeation chromatography (GPC) method under following measurement conditions.

Column: TSKgel α-M of TOSOH CORPORATION (7.8 mm I.D×30 cm)
Eluent: DMF (dimethylformamide)/30 mM LiBr/60 mM phosphoric acid
Flow rate: 0.6 mL/min
Injection volume: 60 μL
Detector: RI (differential refractive index detector)

In this exemplary embodiment, a content of the polyimide precursor is, for example, preferably 0.1% by mass to 40% by mass, and more preferably 1% by mass to 25% by mass with respect to a total mass of the polyimide precursor solution.

Particles

The polyimide precursor solution used in the first step contains particles.

From the viewpoint of forming pores, for example, it is preferable that the particles are not dissolved but are in a state of being dispersed in the polyimide precursor solution.

A material of the particles is not particularly limited as long as particles are particles that are not dissolved in the polyimide precursor solution.

In this exemplary embodiment, the phrase "particles that are not dissolved" refers to a state in which particles are not dissolved in a target liquid (specifically, the solvent contained in the polyimide precursor solution) at 25° C., and also refers to a state in which particles are dissolved in a target liquid by a range of 3% by mass or less at 25° C.

The particles are approximately classified into resin particles and inorganic particles, and any of these particles may be used, but for example, resin particles are preferable from the viewpoint of excellent removability of particles in the second step to be described later.

Resin Particles

The resin particles are not particularly limited as long as resin particles are resin particles that are not dissolved in the polyimide precursor solution (specifically, the solvent contained in the polyimide precursor solution). In consideration of removability of particles in the second step to be described later, for example, resin particles are preferably made of a resin other than polyimide.

Examples of resin particles include resin particles obtained by polycondensation of polymerizable monomers such as a polyester resin and a urethane resin, and resin particles obtained by addition polymerization (specifically, radical addition polymerization) of polymerizable monomers such as a vinyl resin, an olefin resin, and a fluorine resin.

Among the above examples, as resin particles, for example, a vinyl resin is preferable, and specifically, at least one selected from the group consisting of a (meth)acrylic resin, a (meth)acrylic ester resin, a styrene-(meth)acrylic resin, and a polystyrene resin is preferable.

In addition, the resin particles may be cross-linked or may not be cross-linked.

In addition, the resin particles are, for example, preferably used as a resin particle dispersion containing resin particles obtained by emulsion polymerization or the like from the viewpoint of simplifying steps of producing the polyimide precursor solution.

In this exemplary embodiment, the term "(meth)acrylic" includes both "acrylic" and "methacrylic."

In a case where the resin particles are made of a vinyl resin, examples of monomers used for obtaining the vinyl resin include monomers shown below.

Examples of monomers used for obtaining the vinyl resin include styrenes having a styrene skeleton such as styrene, alkyl-substituted styrene (such as α-methylstyrene, 2-methylstyrene, 3-methylstyrene, 4-methylstyrene, 2-ethylstyrene, 3-ethylstyrene, and 4-ethylstyrene), halogen-substituted styrene (such as 2-chlorostyrene, 3-chlorostyrene, and 4-chlorostyrene), and vinyl naphthalene; esters (also called (meth)acrylates) having a vinyl group such as methyl (meth)acrylate, ethyl (meth)acrylate, n-propyl (meth)acrylate, n-butyl (meth)acrylate, lauryl (meth)acrylate, and 2-ethylhexyl (meth)acrylate; vinyl nitriles such as acrylonitrile and methacrylonitrile; vinyl ethers such as vinyl methyl ether and vinyl isobutyl ether; vinyl ketones such as vinyl methyl ketone, vinyl ethyl ketone, and vinyl isopropenyl ketone; acids such as a (meth)acrylic acid, a maleic acid, a cinnamic acid, a fumaric acid, and a vinylsulfonic acid; bases such as ethyleneimine, vinylpyridine, and vinylamine; and the like.

In addition to the above-mentioned monomers, as other monomers, monofunctional monomers such as vinyl acetate, bifunctional monomers such as ethylene glycol dimethacrylate, nonanediacrylate, and decanediol diacrylate, and polyfunctional monomers such as trimethylolpropane triacrylate and trimethylolpropane trimethacrylate may be used in combination.

In addition, the vinyl resin may be a resin using one kind of these monomers alone, or may be a resin that is a copolymer formed of two or more kinds of the monomers.

In a case where the resin particles are made of a vinyl resin, for example, the vinyl resin is preferably a vinyl resin obtained by using styrene as a monomer. In the vinyl resin obtained by using styrene, a percentage of styrene accounting for a total mass of monomer components is, for example, preferably 20% by mass to 100% by mass, and more preferably 40% by mass to 100% by mass.

That is, in the vinyl resin, a content of a structural unit derived from styrene is, for example, preferably 20% by mass to 100% by mass, and more preferably 40% by mass to 100% by mass with respect to a mass of the vinyl resin.

An average particle diameter, a shape, and the like of the resin particles are not particularly limited and may be appropriately determined according to a size and/or a shape of intended pores.

A volume average particle diameter of the resin particles is, for example, within a range of 0.05 μm to 3.0 μm. A volume average particle diameter of the resin particles is, for example, preferably 0.07 μm or more, more preferably 0.09 μm or more, and even more preferably 0.10 μm or more. In addition, a volume average particle diameter of the resin particles is, for example, preferably 2.50 μm or less, more preferably 2.45 μm or less, and more preferably 2.40 μm or less.

As an average particle diameter of the resin particles, a particle size distribution obtained by measurement with a laser diffraction type particle size distribution measuring apparatus (for example, COULTER COUNTER LS13, Beckman Coulter, Inc.) is used, a cumulative distribution is subtracted from a divided particle size range (channel), from a smaller particle diameter in the volume, and a particle diameter accumulating 50% of all the particles is measured as a volume average particle diameter D50v.

Inorganic Particles

Specific examples of inorganic particles include inorganic particles such as silica (silicon dioxide) particles, magnesium oxide particles, alumina particles, zirconia particles, calcium carbonate particles, calcium oxide particles, titanium dioxide particles, zinc oxide particles, and cerium oxide particles. As described above, regarding a shape of the particles, for example, particles close to spherical may be used. From this viewpoint, as the inorganic particles, for example, inorganic particles such as silica particles, magnesium oxide particles, calcium carbonate particles, magnesium oxide particles, and alumina particles are preferable; inorganic particles such as silica particles, titanium oxide particles, and alumina particles are more preferable; and silica particles are even more preferable.

These inorganic particles may be used alone or may be used in combination of two or more kinds thereof.

In a case where degrees of wettability and dispersibility of the inorganic particles in the polyimide precursor solution with respect to the solvent are insufficient, a surface of the inorganic particles may be modified as necessary.

Examples of methods of modifying a surface of the inorganic particles include a method of treating with an alkoxysilane having an organic group represented by a silane coupling agent; a method of coating with an organic acid such as oxalic acid, citric acid, and lactic acid; and the like.

An average particle diameter and a shape of the inorganic particles are not particularly limited and may be appropriately determined according to each of a size and a shape of intended pores.

A content of the particles contained in the polyimide precursor solution used in the first step is, for example, preferably 0.1% by mass to 40% by mass, more preferably 0.5% by mass to 30% by mass, even more preferably 1% by mass to 25% by mass, and still more preferably 1% by mass to 20% by mass with respect to a total mass of the polyimide precursor solution.

Solvent

The polyimide precursor solution used in the first step contains a solvent.

The solvent is preferably, for example, a solvent that dissolves the polyimide precursor and does not dissolve or hardly dissolve the particles.

The solvent is not particularly limited as long as a solvent has the above properties, but the solvent is, for example, preferably a water-soluble organic solvent, water, or a mixed solvent thereof, and more preferably a mixed solvent of a water-soluble organic solvent and water (also referred to as an aqueous solvent).

Water-Soluble Organic Solvent

The term "water-soluble" in the water-soluble organic solvent refers to a state in which a target substance is dissolved by 1% by mass or more with respect to the water at 25° C.

Examples of water-soluble organic solvents include aprotic polar solvents, water-soluble ether solvents, water-soluble ketone solvents, and water-soluble alcohol solvents.

Specific examples of aprotic polar solvents include N-methyl-2-pyrrolidone (NMP), N,N-dimethylformamide (DMF), N,N-1,3-dimethyl-2-imidazolidinone (DMI), N,N-dimethylacetamide (DMAc), N,N-diethylacetamide (DEAc), dimethylsulfoxide (DMSO), hexamethylene phosphoramide (HMPA), N-methylcaprolactam, N-acetyl-2-pyrrolidone, 1,3-dimethyl-imidazolidone, and the like. Among the above examples, as aprotic polar solvents, for example, N-methyl-2-pyrrolidone (NMP), N,N-dimethylformamide (DMF), N,N-1,3-dimethyl-2-imidazolidinone (DMI), and N,N-dimethylacetamide (DMAc) are preferable.

A water-soluble ether solvent is a water-soluble solvent having an ether bond in one molecule. Examples of water-soluble ether solvents include tetrahydrofuran (THF), dioxane, trioxane, 1,2-dimethoxyethane, diethylene glycol dimethyl ether, diethylene glycol diethyl ether, and the like. Among the above examples, for example, tetrahydrofuran and dioxane are preferable as the water-soluble ether solvent.

A water-soluble ketone solvent is a water-soluble solvent having a ketone group in one molecule. Examples of water-soluble ketone solvents include acetone, methyl ethyl ketone, cyclohexanone, and the like. Among the above examples, for example, acetone is preferable as the water-soluble ketone solvent.

A water-soluble alcohol solvent is a water-soluble solvent having an alcoholic hydroxyl group in one molecule. Examples of water-soluble alcohol solvents include methanol, ethanol, 1-propanol, 2-propanol, tert-butyl alcohol, ethylene glycol, monoalkyl ether of ethylene glycol, propylene glycol, monoalkyl ether of propylene glycol, diethylene glycol, monoalkyl ether of diethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, 1,2,6-hexanetriol, and the like. Among the above examples, as the water-soluble alcohol solvent, for example, methanol, ethanol, 2-propanol, ethylene glycol, monoalkyl ether of ethylene glycol, propylene glycol, monoalkyl ether of propylene glycol, diethylene glycol, monoalkyl ether of diethylene glycol are preferable.

The water-soluble organic solvent preferably contains, for example, an organic amine compound.

Hereinafter, the organic amine compound will be described.

Organic Amine Compound

The organic amine compound is a compound which amine-salifies the polyimide precursor (a carboxyl group thereof) to improve solubility of the polyimide precursor in an aqueous solvent, and which also function as an imidization promoter. Specifically, the organic amine compound is, for example, preferably an amine compound having a molecular weight of 170 or less. The organic amine compound is, for example, preferably a compound excluding a diamine compound that is a raw material of the polyimide precursor.

The organic amine compound is, for example, preferably a water-soluble compound. The term "water-soluble" refers to a state in which a target substance is dissolved by 1% by mass or more with respect to water at 25° C.

Examples of organic amine compounds include a primary amine compound, a secondary amine compound, and a tertiary amine compound.

Among the above examples, as the organic amine compound, for example, at least one (particularly, the tertiary amine compound) selected from the secondary amine compound or the tertiary amine compound is preferable. In a case of applying the tertiary amine compound or the secondary amine compound as the organic amine compound (particularly, the tertiary amine compound), solubility of the polyimide precursor in a solvent is easily improved, film forming properties are easily improved, and preservation stability of the polyimide precursor solution is easily improved.

In addition, examples of organic amine compounds include a divalent or higher polyvalent amine compound, in addition to a monovalent amine compound. In a case of applying the divalent or higher polyvalent amine compound, a pseudo-crosslinked structure between molecules of the polyimide precursor is easily formed, and preservation stability of the polyimide precursor solution is easily improved.

Examples of primary amine compounds include methylamine, ethylamine, n-propylamine, isopropylamine, 2-ethanolamine, 2-amino-2-methyl-1-propanol, and the like.

Examples of secondary amine compounds include dimethylamine, 2-(methylamino)ethanol, 2-(ethylamino)ethanol, morpholine, and the like.

Examples of tertiary amine compounds include 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-alkylpiperidine (for example, N-methylpiperidine, N-ethylpiperidine, and the like), and the like.

The organic amine compound is preferably, for example, the tertiary amine compound from the viewpoint of obtaining a film having high strength. From this viewpoint, for example, at least one selected from the group consisting of 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine is more preferable. For example, N-alkylmorpholine is particularly preferably used.

As the organic amine compound, from the viewpoint of obtaining a film having high strength, for example, an aliphatic cyclic structured or aromatic cyclic structured amine compound having a heterocyclic structure containing nitrogen (hereinafter referred to as the "nitrogen-containing heterocyclic amine compound") is also preferable. The nitrogen-containing heterocyclic amine compound is, for example, more preferably a tertiary amine compound. That is, for example, a tertiary cyclic amine compound is even more preferable.

Examples of tertiary cyclic amine compounds include isoquinolines (amine compounds having an isoquinoline skeleton), pyridines (amine compounds having a pyridine skeleton), pyrimidines (amine compounds having a pyrimidine skeleton), pyrazines (amine compounds having a pyrazine skeleton), piperazines (amine compounds having a piperazine skeleton), triazines (amine compounds having a triazine skeleton), imidazoles (amine compounds having an imidazole skeleton), morpholines (amine compounds having a morpholine skeleton), polyaniline, polypyridine, and the like.

As the tertiary cyclic amine compound, for example, at least one selected from the group consisting of morpholines, pyridines, piperidines, and imidazoles is preferable, and morpholines (amine compounds having a morpholine skeleton) (that is, a morpholine-based compound) is more preferable from the viewpoint of obtaining a polyimide film in which variation in film thickness is inhibited. Among the above examples, for example, at least one selected from the group consisting of N-methylmorpholine, N-methylpiperidine, pyridine, 1,2-dimethylimidazole, 2-ethyl-4-methylimidazole, and picoline is more preferable, and N-methylmorpholine is even more preferable.

The organic amine compound may be used alone or may be used in combination of two or more kinds thereof.

A content ratio of the organic amine compound used in this exemplary embodiment is, for example, preferably 30% or less and more preferably 15% or less with respect to a total mass of the polyimide precursor solution. In addition, the lower limit of a content ratio of the organic amine compound is not particularly limited, but may be, for example, 1% or more with respect to a total mass of the polyimide precursor solution.

The water-soluble organic solvent may be used alone or may be used in combination of two or more kinds thereof.

A boiling point of the water-soluble organic solvent is, for example, preferably 270° C. or lower, more preferably 60° C. to 250° C., and even more preferably 80° C. to 230° C. from the viewpoint of inhibiting the residual on the porous polyimide film and obtaining a porous polyimide film having high mechanical strength.

A content ratio of the water-soluble organic solvent used in this exemplary embodiment is, for example, preferably 30% by mass or less and more preferably 20% by mass or less with respect to a total mass of the aqueous solvent contained in the polyimide precursor solution.

In addition, the lower limit of a content ratio of the water-soluble organic solvent is not particularly limited, but may be, for example, 1% or more with respect to a total mass of the polyimide precursor solution.

Water

Examples of water include distilled water, ion exchange water, ultrafiltered water, pure water, and the like.

A content ratio of water used in this exemplary embodiment is, for example, preferably 50% by mass to 90% by mass, more preferably 60% by mass to 90% by mass, and even more preferably 60% by mass to 80% by mass with respect to a total mass of the aqueous solvent contained in the polyimide precursor solution.

A content of the aqueous solvent contained in the polyimide precursor solution used in the first step is, for example, preferably 50% by mass to 99% by mass, and more preferably 40% by mass to 99% by mass with respect to a total mass of the polyimide precursor solution.

Other Additives

The polyimide precursor solution used in the first step may include a catalyst for accelerating an imidization reaction, a leveling agent for improving quality of a film to be formed, and the like.

As the catalyst for accelerating an imidization reaction, a dehydrating agent such as an acid anhydride, an acid catalyst such as a phenol derivative, a sulfonic acid derivative, and a benzoic acid derivative, or the like may be used.

In addition, depending on the intended use of a polyimide film, the polyimide precursor solution may include, for example, a conductive agent (for example, an agent in which conductivity is less than $10^7$ Ω·cm of volume resistivity) or a semi-conductive agent (for example, an agent in which conductivity is $10^7$ Ω·cm to $10^{13}$ Ω·cm of volume resistivity) to impart conductivity.

Examples of conductive agents include carbon black (for example, acidic carbon black having a pH of 5.0 or less); metals (for example, aluminum, nickel, and the like); metal oxides (for example, yttrium oxide, tin oxide, and the like); ion conducting substances (for example, potassium titanate, LiCl, and the like); and the like.

These conductive agents may be used alone or may be used in combination of two or more kinds thereof.

In addition, according to the intended use of a polyimide film, the polyimide precursor solution may contain inorganic particles which are added for improving mechanical strength.

Examples of inorganic particles include particulate materials such as silica powder, alumina powder, barium sulfate powder, titanium oxide powder, mica, and talc.

Furthermore, $LiCoO_2$, $LiMn_2O$, or the like used as an electrode of a lithium ion battery may be included.

Method for Preparing Polyimide Precursor Solution

A method for preparing the polyimide precursor solution used in the first step is not particularly limited.

From the viewpoint of simplifying steps, for example, a method is preferable in which a polyimide precursor solution is prepared by synthesizing a polyimide precursor in a dispersion in which particles are dispersed in an aqueous solvent. In a case where particles are resin particles, the dispersion may be obtained by granulating the resin particles in an aqueous solvent.

As an example of a method for preparing the polyimide precursor solution, the following method is specifically exemplified.

First, resin particles are granulated in an aqueous solvent to obtain a resin particle dispersion. Next, in the resin particle dispersion, a tetracarboxylic dianhydride and a diamine compound are polymerized in the presence of an organic amine compound to generate a resin (a polyimide precursor), and thereby a polyimide precursor solution is formed.

Another examples of methods for preparing the polyimide precursor solution include a method of mixing a solution in which a polyimide precursor is dissolved in an aqueous solvent with resin particles in a dry state, a method of mixing a solution in which a polyimide precursor is dissolved in an aqueous solvent with a dispersion in which resin particles are previously dispersed in an aqueous solvent, and the like.

Application and Drying of Polyimide Precursor Solution

In the first step, the polyimide precursor solution obtained by the above-described method is applied to a substrate to form a coating film. This coating film contains a solution containing a polyimide precursor, and particles. In addition, particles in this coating film are distributed in a state in which aggregation is inhibited.

Thereafter, the coating film formed on the substrate is dried, and thereby a film containing a polyimide precursor and particles is formed.

The substrate to which the polyimide precursor solution is applied is not particularly limited.

Examples of substrates include substrates made of resin such as polystyrene and polyethylene terephthalate; glass substrates; ceramic substrates; substrates made of metal such as iron and stainless steel (SUS); composite material substrates obtained by combining these materials; and the like.

In addition, as necessary, the substrate may have, for example, a peeling layer by subjecting the substrate to a peeling process using a silicone-based or fluorine-based peeling agent, or the like. Furthermore, it is also effective to roughen a surface of the substrate to a size of about a particle diameter of particles to promote exposure of the particles on a surface in contact with the substrate.

A method of applying the polyimide precursor solution to the substrate is not particularly limited, and examples thereof include various methods such as a spray coating method, a spin coating method, a roll coating method, a bar coating method, a slit die coating method, and an ink jet coating method.

A method of drying a coating film to be formed on the substrate is not particularly limited, and examples thereof include various methods such as drying by heating, natural drying, and vacuum drying.

More specifically, a film may be formed by drying a coating film such that an amount of a solvent remaining on the film becomes 50% or less (for example, preferably 30% or less) with respect to a solid content of the film.

Because a dispersion state of particles changes depending on a drying speed, irregularities of a dispersion state of pores in a porous polyimide film to be produced are controlled according to the drying speed.

Specifically, in a case where a drying speed is slow, because particles easily move in the coating film, dispersibility of the particles in the coating film is improved, and therefore irregularities of a dispersion state of pores in the porous polyimide film tend to be reduced. On the other hand, in a case where a drying speed is fast, particles are likely to be fixed in the coating film in a state where the particles are unevenly distributed therein, and therefore irregularities of a dispersion state of pores in the porous polyimide film tend to be increased.

The control of a drying speed may be performed by adjusting a drying temperature, adjusting a drying time, and the like.

In the first step, a process of exposing particles may be performed during a process of forming a film by drying after obtaining a coating film. By performing the process of exposing particles, a rate of pore area of the porous polyimide film is increased.

Specific examples of processes of exposing particles include the following methods.

During a process of obtaining a coating film containing a polyimide precursor and particles, and then drying the coating film to form a film containing the polyimide precursor and particles, the polyimide precursor in the formed film is in a state of being able to be dissolved in water as described above. Accordingly, the particles can be exposed from the film by performing, for example, a process of wiping the film with water, a process of immersing the film in water, and the like. Specifically, the polyimide precursor (and a solvent) covering the particles is removed by performing, for example, a process of exposing the particles by wiping a surface of the film with water. As a result, the particles are exposed on the surface of the processed film.

In particular, in a case where a film in which particles are buried is formed, it is preferable to adopt, for example, the above-described process as a process of exposing the particles buried in the film.

Second Step and Third Step

In the second step, particles are removed from the film obtained in the first step. By removing the particles from the film, a porous film is formed.

In the third step, the film is heated to imidize the polyimide precursor in the film.

By performing the second step and the third step, a porous polyimide film is produced.

Removal of Particles

A method of removing particles from the film in the second step may be appropriately determined according to particles in the film.

Examples of methods of removing particles from the film include a method of decomposing and removing particles (for example, preferably resin particles) by heating, a method of removing particles by dissolving the particles in an organic solvent, a method of removing resin particles through decomposition using a laser and the like, and the like.

One kind of these methods may be performed alone, or two or more kinds thereof may be used in combination. Using two or more methods of removing particles from the film, a shape (specifically, flattening) of pores may be controlled by adjusting a removal rate of the particles.

In a case where the method of decomposing and removing particles by heating is used, a method that also serves as the third step to be described later may be used, but from the viewpoint of easily controlling a shape of pores (specifically, flattening), for example, it is preferable to remove particles from the film in the second step, and then perform the third step (imidization).

In the case of the method of decomposing and removing resin particles by heating in the second step, examples of heating conditions include the following conditions.

A heating temperature is, for example, preferably 150° C. to 350° C., more preferably 170° C. to 350° C., and even more preferably 200° C. to 350° C.

In addition, a heating time is, for example, preferably 1 minute to 60 minutes, more preferably 1 minute to 45 minutes, and even more preferably 1 minute to 30 minutes.

In a case of using the method of removing resin particles by dissolving the resin particles in an organic solvent, specific examples thereof include a method of bringing a film into contact with an organic solvent, and dissolving resin particles in the organic solvent to remove the resin particles.

Examples of methods of bringing a film into contact with an organic solvent include a method of immersing a film in an organic solvent, a method of applying an organic solvent to a film, a method of bringing a film into contact with organic solvent vapors, and the like.

An organic solvent used for dissolving resin particles is not particularly limited as long as an organic solvent does not dissolve a polyimide precursor and polyimide but can dissolve resin particles.

In a case where particles are resin particles, examples of organic solvents include ethers such as tetrahydrofuran and 1,4-dioxane; aromatics such as benzene and toluene; ketones such as acetone; and esters such as ethyl acetate.

Among the above examples, for example, ethers such as tetrahydrofuran and 1,4-dioxane; or aromatics such as benzene and toluene are preferable, and tetrahydrofuran or toluene is more preferable.

In the case of using the method of removing particles by dissolving the resin particles in an organic solvent, an imidization ratio of a polyimide precursor in a film is, for example, preferably is 10% or more from the viewpoint of removability of particles, and inhibition of a film from being dissolved in an organic solvent.

Examples of methods of setting an imidization ratio to 10% or more include heating in one stage to be described later.

That is, for example, it is preferable to perform the heating in one stage to be described later, and then remove particles in a film by dissolving the particles with an organic solvent.

Imidization

As heating to imidize a polyimide precursor in a film in the third step, it is preferable to use, for example, heating in multiple stages of two or more stages.

For example, in a case where particles are resin particles and are heated in two stages, the following heating conditions are specifically adopted.

A shape of pores (specifically, flattening) is controlled by the heating conditions in a case of imidizing a polyimide precursor. A shape of pores (specifically, flattening) is controlled by appropriately controlling the heating conditions (that is, a heating temperature and a heating time) to change a contraction percentage (particularly in a thickness direction) of a film.

As conditions for one-stage heating, for example, a temperature at which a shape of resin particles is retained is preferable. Specifically, a temperature is, for example, preferably within a range of 50° C. or higher to lower than 250° C., and more preferably within a range of 100° C. to 230° C. In addition, a heating time is, for example, preferably within a range of 10 minutes to 120 minutes. A heating time may become shorter as a heating temperature becomes higher.

In the conditions for one-stage heating, a heating temperature is also referred to as a pre-imidization temperature, and a heating time is also referred to as a pre-imidization time.

As conditions for two-stage heating, heating is performed, for example, under conditions of 250° C. to 500° C. (for example, preferably 300° C. to 450° C.) for 20 minutes to 120 minutes. By setting the heating conditions within this range, an imidization reaction further proceeds. In a case of a heating reaction, heating may be performed by, for example, raising a temperature stage by stage, or gradually raising a temperature at a certain speed before the temperature reaches a final temperature for the heating.

In the conditions for two-stage heating, a heating temperature is also referred to as a baking temperature, and a heating time is also referred to as a baking time.

Adopting the heating conditions are not limited to the above-described method of heating in two stages, and the heating conditions may be adopted to, for example, a method of heating in one stage. In the case of the method of heating in one stage, imidization may be completed only under, for example, the above-described conditions for two-stage heating.

An imidization ratio of the polyimide precursor will be described.

Examples of partially imidized polyimide precursors include a precursor having a structure having a repeating unit represented by General Formula (I-1), General Formula (I-2), and General Formula (I-3).

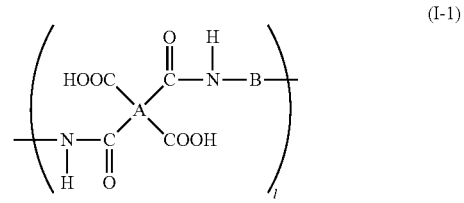

(I-1)

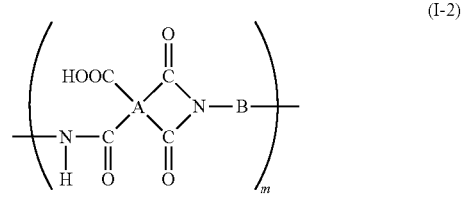

(I-2)

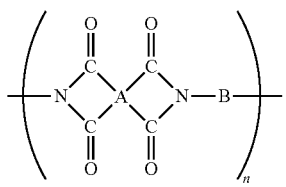

(I-3)

In General Formulas (I-1), (I-2), and (I-3), A represents a tetravalent organic group, and B represents a divalent organic group. l represents an integer of 1 or more, and m and n each independently represent an integer of 0 or 1 or more.

A and B are synonymous with A and B in General Formula (I).

An imidization ratio of the polyimide precursor represents a rate of the number of bonding parts (2n+m) with imide ring closure to a total number of bonding parts (2l+2m+2n) in a bonding part of the polyimide precursor (a reaction part of a tetracarboxylic dianhydride and a diamine compound). That is, an imidization ratio of the polyimide precursor is represented by "(2n+m)/(2l+2m+2n)."

An imidization ratio (a value of "(2n+m)/(2l+2m+2n)") of the polyimide precursor is measured by the following method.

Measurement of Imidization Ratio of Polyimide Precursor

Production of Polyimide Precursor Sample (i) A coating film sample is produced by applying a polyimide precursor solution, which is a measurement target, to a silicon wafer within a film thickness range of 1 μm to 10 μm.

(ii) The coating film sample is immersed in tetrahydrofuran (THF) for 20 minutes, and a solvent in the coating film sample is replaced with tetrahydrofuran (THF). The solvent in which the sample is immersed is not limited to THF, and the solvent is selected from solvents that do not dissolve a polyimide precursor and are miscible with solvent components contained in the polyimide precursor solution. Specifically, alcohol solvents such as methanol and ethanol, and ether compounds such as dioxane are used.

(iii) The coating film sample is taken out from the THF, and $N_2$ gas is blown to the THF adhering to a surface of the coating film sample, and thereby the THF is removed. The coating film sample is dried by being processed for 12 hours or longer under reduced pressure of 10 mmHg or less and at a temperature within a range of 5° C. to 25° C., and thereby a polyimide precursor sample is produced.

Production of 100%-Imidized Standard Sample (iv) In the same manner as in (i), a polyimide precursor solution, which is a measurement target, is applied to a silicon wafer, and thereby a coating film sample is produced.

(v) The coating film sample is heated at 380° C. for 60 minutes to perform an imidization reaction, and thereby a 100%-imidized standard sample is produced.

Measurement and Analysis (vi) An infrared absorption spectrum of each of the 100%-imidized standard sample and the polyimide precursor sample is measured using a Fourier transform infrared spectrophotometer (FT-730 manufactured by HORIBA, Ltd.). A ratio I' (100) of an imide bond-derived absorption peak near 1780 $cm^{-1}$ (Ab' (1780 $cm^{-1}$)) to an aromatic ring-derived absorption peak near 1500 $cm^{-1}$ (Ab'(1500 $cm^{-1}$)) of the 100%-imidized standard sample is obtained.

(vii) In the same manner, the measurement is performed on the polyimide precursor sample, and a ratio I(x) of an imide bond-derived absorption peak near 1780 $cm^{-1}$ (Ab' (1780 $cm^{-1}$)) to an aromatic ring-derived absorption peak near 1500 $cm^{-1}$ (Ab'(1500 $cm^{-1}$)) is obtained.

Then, using each of the measured absorption peaks I' (100) and I(x), an imidization ratio of the polyimide precursor is calculated based on the following equations.

imidization ratio of polyimide precursor=$I(x)/I'(100)$  Equation $I'(100)=(Ab'(1780\ cm^{-1}))/(Ab'(1500\ cm^{-1}))$  Equation $I(x)=(Ab(1780\ cm^{-1}))/(Ab(1500\ cm^{-1}))$  Equation This measurement of an imidization ratio of the polyimide precursor is applied to a measurement of an imidization ratio of an aromatic polyimide precursor. In a case of measuring an imidization ratio of the aliphatic polyimide precursor, a peak derived from a structure which does not change before and after an imidization reaction is used as an internal standard peak, instead of an aromatic ring-derived absorption peak.

The substrate used in the first step may be peeled off from a film after the first step, may be peeled off from a film after the second step, or may be peeled off from a porous polyimide film to be obtained after the third step.

Lithium-Ion Secondary Battery Separator and Secondary Battery

A lithium-ion secondary battery separator according to this exemplary embodiment and a secondary battery according to this exemplary embodiment will be described.

The lithium-ion secondary battery separator according to this exemplary embodiment includes the above-described porous polyimide film according to this exemplary embodiment.

In addition, the secondary battery according to this exemplary embodiment includes the lithium-ion secondary battery separator according to this exemplary embodiment.

Hereinafter, the lithium-ion secondary battery separator according to this exemplary embodiment and the secondary battery according to this exemplary embodiment will be described with reference to FIG. 3.

Figure 3:
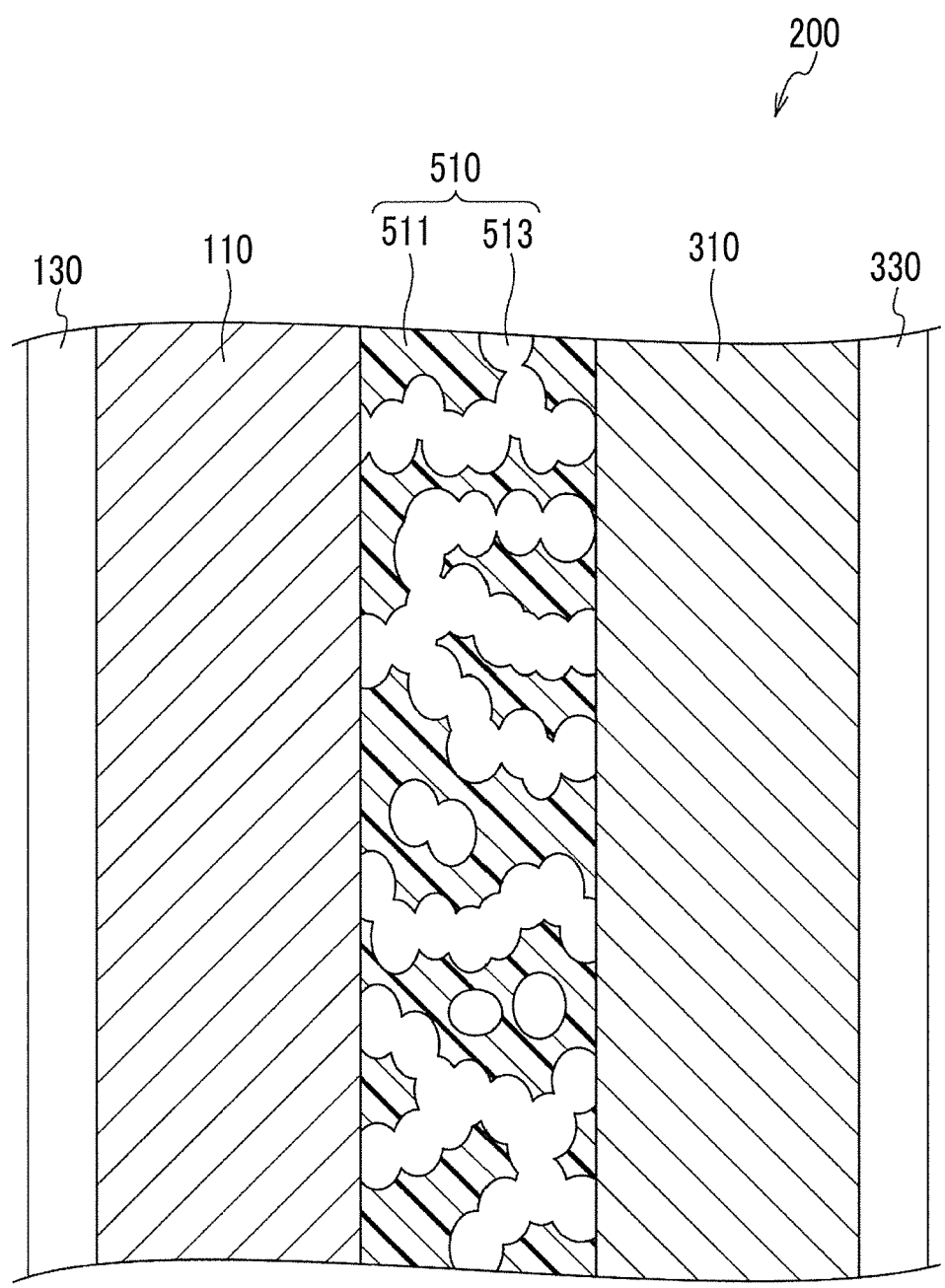
FIG. 3 is a schematic partial cross-sectional diagram showing an example of a lithium-ion secondary battery.

FIG. 3 is a schematic partial cross-sectional diagram showing an example of the lithium-ion secondary battery according to this exemplary embodiment.

As shown in FIG. 3, a lithium-ion secondary battery 200 includes a positive electrode active material layer 110, a separator layer 510, and a negative electrode active material layer 310, which are accommodated inside an exterior member (not shown). The positive electrode active material layer 110 is provided on a positive electrode current collector 130, and the negative electrode active material layer 310 is provided on a negative electrode current collector 330. The separator layer 510 is provided to separate the positive electrode active material layer 110 from the negative electrode active material layer 310, and is disposed between the positive electrode active material layer 110 and the negative electrode active material layer 310 such that the positive electrode active material layer 110 and the negative electrode active material layer 310 face each other. The separator layer 510 has a separator 511, and an electrolyte solution 513 with which the inside of pores of the separator 511 is filled. As the separator 511, the porous polyimide film according to this exemplary embodiment is applied. The positive electrode current collector 130 and the negative electrode current collector 330 are members provided as needed.

Positive Electrode Current Collector 130 and Negative Electrode Current Collector 330

A material used for the positive electrode current collector 130 and the negative electrode current collector 330 is not particularly limited, and may be any known conductive material. For example, metals such as aluminum, copper, nickel, and titanium can be used.

Positive Electrode Active Material Layer 110

The positive electrode active material layer 110 is a layer containing a positive electrode active material. Known additives such as a conductive assistant and a binder resin may be incorporated therein as necessary. The positive electrode active material is not particularly limited, and a known positive electrode active material is used. Examples thereof include complex oxides containing lithium ($LiCoO_2$, $LiNiO_2$, $LiMnO_2$, $LiMn_2O_4$, $LiFeMnO_4$, $LiV_2O_5$, and the like), phosphates containing lithium ($LiFePO_4$, $LiCoPO_4$, $LiMnPO_4$, $LiNiPO_4$, and the like), conductive polymers (polyacetylene, polyaniline, polypyrrole, polythiophene, and the like), and the like. One kind of the positive electrode active material may be used alone, or two or more kinds thereof may be used in combination.

Negative Electrode Active Material Layer 310

The negative electrode active material layer 310 is a layer containing a negative electrode active material. Known additives such as a binder resin may be incorporated therein as necessary. The negative electrode active material is not particularly limited, and a known negative electrode active material is used. Examples thereof include carbon materials (graphite (natural graphite, artificial graphite), carbon nanotubes, graphitized carbon, low-temperature baked carbon, and the like), metals (aluminum, silicon, zirconium, titanium, and the like), metal oxides (tin dioxide, lithium titanate, and the like), and the like. One kind of the negative electrode active material may be used alone, or two or more kinds thereof may be used in combination.

Electrolyte Solution 513

Examples of the electrolyte solution 513 include a non-aqueous electrolyte solution containing an electrolyte and a non-aqueous solvent.

Examples of electrolytes include electrolytes of lithium salts ($LiPF_6$, $LiBF_4$, $LiSbF_6$, $LiAsF_6$, $LiClO_4$, $LiN(FSO_2)_2$, $LiN(CF_3SO_2)_2$, $LiN(C_2F_5SO_2)$, $LiC(CF_3SO_2)_3$, and the like). One kind of the electrolyte may be used alone, or two or more kinds thereof may be used in combination.

Examples of non-aqueous solvents include cyclic carbonates (ethylene carbonate, propylene carbonate, butylene carbonate, and the like), chain carbonates (diethyl carbonate, dimethyl carbonate, ethyl methyl carbonate, methyl acetate, ethyl acetate, methyl propionate, ethyl propionate, γ-butyrolactone, 1,2-dimethoxyethane, 1,2-diethoxyethane, and the like), and the like. One kind of the non-aqueous solvent may be used alone, or two or more kinds thereof may be used in combination.

Method for Producing Lithium-Ion Secondary Battery 200

An example of a method for producing the lithium-ion secondary battery 200 will be described.

An application liquid for forming the positive electrode active material layer 110 containing a positive electrode active material is applied to the positive electrode current collector 130 and dried, and thereby a positive electrode having the positive electrode active material layer 110 provided on the positive electrode current collector 130 is obtained.

In the same manner, an application liquid for forming the negative electrode active material layer 310 containing a negative electrode active material is applied to the negative electrode current collector 330 and dried, and thereby a negative electrode having the negative electrode active material layer 310 provided on the negative electrode current collector 330 is obtained. Each of the positive electrode and the negative electrode may be subjected to compression processing as necessary.

Next, the separator 511 is disposed between the positive electrode active material layer 110 and the negative electrode active material layer 310 such that the positive electrode active material layer 110 of the positive electrode and the negative electrode active material layer 310 of the negative electrode face each other, and thereby a laminate structure is obtained. In the laminate structure, the positive electrode (the positive electrode current collector 130 and the positive electrode active material layer 110), the separator layer 510, and the negative electrode (the negative electrode active material layer 310 and the negative electrode current collector 330) are laminated in this order. At this time, compression processing may be performed as necessary.

Next, the laminate structure is accommodated in an exterior member, and then the electrolyte solution 513 is injected into the laminate structure. The injected electrolyte solution 513 also permeate pores of the separator 511.

Thereby, the lithium-ion secondary battery 200 is obtained.

Hereinbefore, the lithium-ion secondary battery according to this exemplary embodiment has been described with reference to FIG. 3, but the lithium-ion secondary battery according to this exemplary embodiment is not limited thereto. A form thereof is not particularly limited as long as the porous polyimide film according to this exemplary embodiment is applied thereto.

All-Solid-State Battery

Next, an all-solid-state battery to which the porous polyimide film according to this exemplary embodiment has been applied will be described. Hereinafter, description will be made with reference to FIG. 4.

Figure 4:
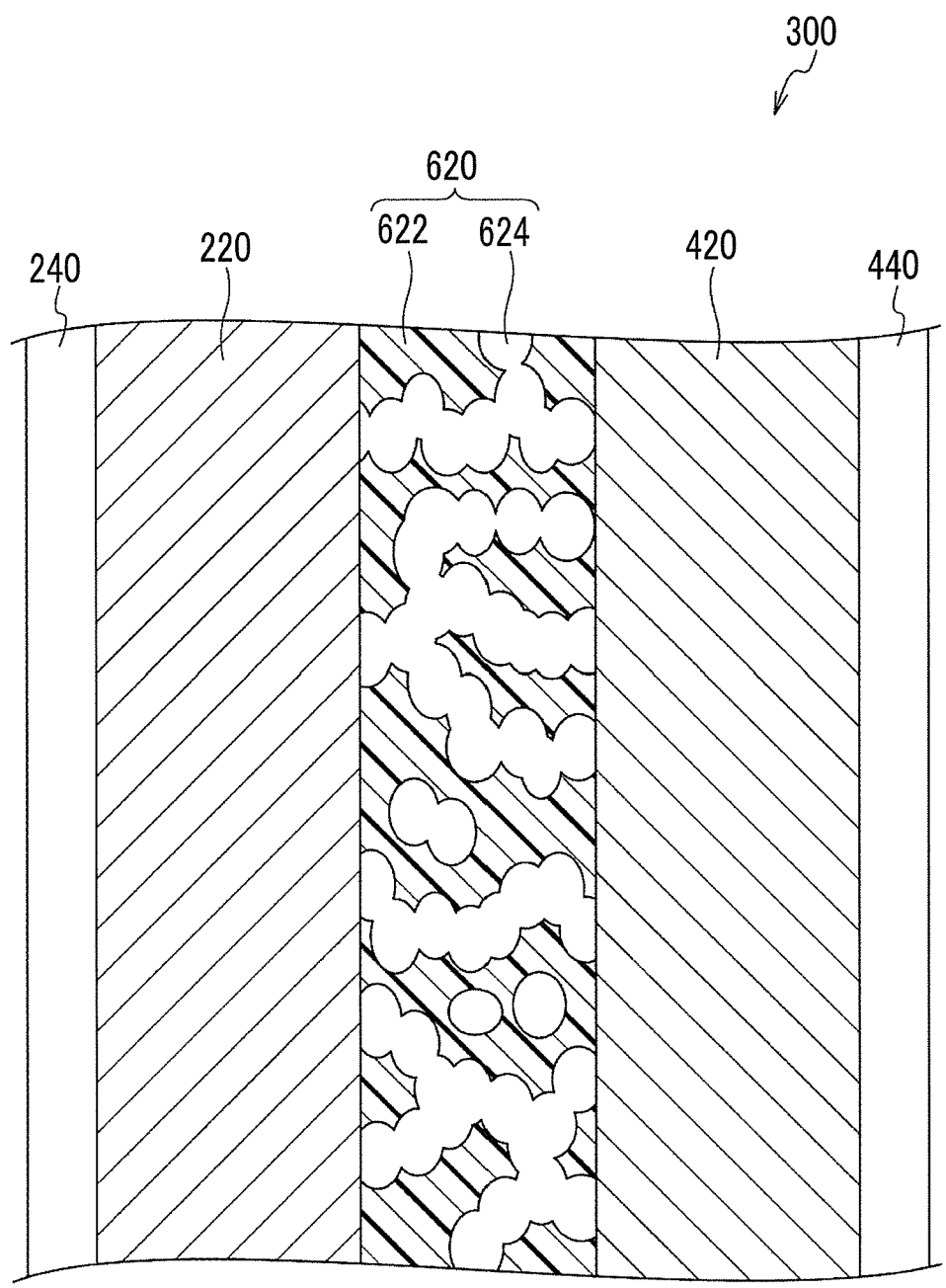
FIG. 4 is a schematic partial cross-sectional diagram showing an example of an all-solid-state battery.

FIG. 4 is a schematic partial cross-sectional diagram showing an example of an all-solid-state battery according to this exemplary embodiment. As shown in FIG. 4, the all-solid-state battery 300 includes a positive electrode active material layer 220, a solid electrolyte layer 620, and a negative electrode active material layer 420, which are accommodated inside an exterior member (not shown). The positive electrode active material layer 220 is provided on a positive electrode current collector 240, and the negative electrode active material layer 420 is provided on a negative electrode current collector 440. The solid electrolyte layer 620 is disposed between the positive electrode active material layer 220 and the negative electrode active material layer 420 such that the positive electrode active material layer 220 and the negative electrode active material layer 420 face each other. The solid electrolyte layer 620 has a solid electrolyte 624 and a retention part 622 retaining the solid electrolyte 624, and the inside of pores of the retention part 622 is filled with the solid electrolyte 624. As the retention part 622 retaining the solid electrolyte 624, the porous polyimide film according to this exemplary embodiment is applied. The positive electrode current collector 240 and the negative electrode current collector 440 are members provided as needed.

Positive Electrode Current Collector 240 and Negative Electrode Current Collector 440

Examples of materials used for the positive electrode current collector 240 and the negative electrode current collector 440 include the same materials as the aforementioned materials for the lithium-ion secondary battery.

Positive Electrode Active Material Layer 220 and Negative Electrode Active Material Layer 420

Examples of materials used for the positive electrode active material layer 220 and the negative electrode active material layer 420 include the same materials as the aforementioned materials for the lithium-ion secondary battery.

Solid Electrolyte 624

The solid electrolyte 624 is not particularly limited, and examples thereof include a known solid electrolyte. For example, a polymer solid electrolyte, an oxide solid electrolyte, a sulfide solid electrolyte, a halide solid electrolyte, a nitride solid electrolyte, and the like are exemplified.

Examples of polymer solid electrolytes include fluororesins (homopolymers such as polyvinylidene fluoride, polyhexafluoropropylene, and polytetrafluoroethylene; copolymers having these homopolymers as constitutional units; and the like), polyethylene oxide resins, polyacrylonitrile resins, polyacrylate resins, and the like. From the viewpoint of excellent lithium ion conductivity, it is preferable to incorporate, for example, a polymer solid electrolyte. From the same viewpoint, it is preferable to incorporate, for example, a sulfide solid electrolyte containing sulfur, and at least one of lithium or phosphorus as constituent elements.

Examples of oxide solid electrolytes include oxide solid electrolyte particles containing lithium. For example, $Li_2O$—$B_2O_3$—$P_2O_5$, $Li_2O$—$SiO_2$, and the like are exemplified.

Examples of sulfide solid electrolytes include a sulfide solid electrolyte containing sulfur, and at least one of lithium or phosphorus as constituent elements. For example, $8Li_2O$-$67Li_2S$-$25P_2S_5$, $Li_2S$, $P_2S_5$, $Li_2S$—$SiS_2$, $LiI$—$Li_2S$—$SiS_2$, $LiI$—$Li_2S$—$P_2S_5$, $LiI$—$Li_3PO_4$—$P_2S_5$, $LiI$—$Li_2S$—$P_2O_5$, $LiI$—$Li_2S$—$B_2S_3$, and the like are exemplified.

Examples of halide solid electrolytes include LiI and the like.

Examples of nitride solid electrolytes include $Li_3N$ and the like.

Method for Producing all-Solid-State Battery 300

An example of a method for producing the all-solid-state battery 300 will be described.

An application liquid for forming the positive electrode active material layer 220 containing a positive electrode active material is applied to the positive electrode current collector 240 and dried, and thereby a positive electrode having the positive electrode active material layer 220 provided on the positive electrode current collector 240 is obtained.

In the same manner, an application liquid for forming the negative electrode active material layer 420 containing a negative electrode active material is applied to the negative electrode current collector 440 and dried, and thereby a negative electrode having the negative electrode active material layer 420 provided on the negative electrode current collector 440 is obtained.

Each of the positive electrode and the negative electrode may be subjected to compression processing as necessary.

Next, an application liquid which contains the solid electrolyte 624 and is for forming the solid electrolyte layer 620 is applied to a substrate and dried, and thereby a layered solid electrolyte is formed.

Next, a porous polyimide film as the retention part 622, and the layered solid electrolyte 624, which are materials for forming the solid electrolyte layer 620, are overlaid on the positive electrode active material layer 220 of the positive electrode. Furthermore, the negative electrode is overlaid on the materials for forming the solid electrolyte layer 620 such that the negative electrode active material layer 420 of the negative electrode is on a side of the positive electrode active material layer 220, and thereby a laminate structure is formed. In the laminate structure, the positive electrode (the positive electrode current collector 240 and the positive electrode active material layer 220), the solid electrolyte layer 620, and the negative electrode (the negative electrode active material layer 420 and the negative electrode current collector 440) are laminated in this order.

Next, the laminate structure is subjected to compression processing to impregnate pores of the porous polyimide film, which is the retention part 622, with the solid electrolyte 624, and the solid electrolyte 624 is retained.

Next, the laminate structure is accommodated in an exterior member.

Thereby, the all-solid-state battery 300 is obtained.

Hereinbefore, the all-solid-state battery according to this exemplary embodiment has been described with reference to FIG. 4, but the all-solid-state battery according to this exemplary embodiment is not limited thereto. A form thereof is not particularly limited as long as the porous polyimide film according to this exemplary embodiment is applied thereto.

EXAMPLES

Examples will be described below, but the present invention is not limited to these examples. In the following description, "parts" and "%" are all based on mass unless otherwise specified.

Preparation of Particles

Resin Particle Dispersion (1)

300 parts by mass of styrene, 11.9 parts by mass of a surfactant, DOWFAX 2A1 (47% solution, Dow Chemical Company), and 150 parts by mass of deionized water are mixed and agitated with a dissolver at 1500 rpm for 30 minutes, followed by emulsification, and thereby a monomer emulsion is produced. Subsequently, 0.9 parts by mass of DOWFAX 2A1 (47% solution, Dow Chemical Company) and 446.8 parts by mass of deionized water are put into a reaction vessel. After heating to 75° C. in a nitrogen stream, 24 parts by mass of the monomer emulsion is added thereto. Thereafter, a polymerization initiator solution in which 5.4 parts by mass of ammonium persulfate has been dissolved in 25 parts by mass of deionized water is added dropwise over 10 minutes. After the dropwise addition, the reaction is allowed to proceed for 50 minutes, and then the remaining monomer emulsion is added dropwise over 180 minutes, further reacted for 180 minutes, and cooled, and thereby a resin particle dispersion (1) is obtained. A concentration of solid contents of the resin particle dispersion (1) is 36.0% by mass. In addition, an average particle diameter of these resin particles is 0.38 μm.

Resin Particle Dispersion (2)

770 parts by mass of styrene, 230 parts by mass of butyl acrylate, 5.0 parts by mass of a surfactant, DOWFAX 2A1 (47% solution, Dow Chemical Company), and 576 parts by mass of ion exchange water are mixed and agitated with a dissolver at 1500 rpm for 30 minutes, followed by emulsification, and thereby a monomer emulsion is produced. Subsequently, 1270 parts by mass of ion exchange water is put into a reaction vessel. After heating to 75° C. in a nitrogen stream, 25 parts by mass of the monomer emulsion is added thereto. Thereafter, a polymerization initiator solution in which 15 parts by mass of ammonium persulfate has been dissolved in 98 parts by mass of ion exchange water is added dropwise over 10 minutes. After the dropwise addition, the reaction is allowed to proceed for 50 minutes, and then the remaining monomer emulsion is added dropwise over 220 minutes and further reacted for 50 minutes. Subsequently, a solution in which 5 parts by mass of maleic acid and 10 parts by mass of ion exchange water has been mixed is added dropwise over 5 minutes, the reaction is allowed to proceed for 150 minutes, followed by cooling, and thereby a resin particle dispersion (2) which is a dispersion of styrene-acrylic resin particles having an acidic group on the surface thereof is obtained. A concentration of solid contents of the resin particle dispersion (2) is 34.0% by mass. In addition, an average particle diameter of these resin particles is 0.80 µm.

Preparation of Polyimide-Precursor-Containing Liquid

Production of Polyimide-Precursor-Containing Liquid (A)

560.0 parts by mass of ion exchange water are heated to 50° C. in a nitrogen stream, and while agitating, 53.75 parts by mass of p-phenylenediamine and 146.25 parts by mass of 3,3',4,4'-biphenyltetracarboxylic dianhydride are added. While agitating, a mixture of 150.84 parts by mass of N-methylmorpholine (hereinafter referred to as "MMO") and 89.16 parts by mass of ion exchange water is added at 50° C. over 20 minutes in a nitrogen stream. The reaction is allowed to proceed for 15 hours at 50° C., and thereby a polyimide-precursor-containing liquid (A) in which a concentration of solid contents of a polyimide precursor is 20% by mass is obtained.

Production of Polyimide-Precursor-Containing Liquid (B)

109.06 parts by mass of pyromellitic dianhydride is reacted with 100.12 parts by mass of 4,4'-diaminodiphenyl ether in dimethylacetamide and thereby a polyimide-precursor-containing liquid (B) in which a concentration of solid contents of a polyimide precursor is 10% by mass is obtained.

Example 1

The polyimide-precursor-containing liquid (A): 169.85 parts, the resin particle dispersion (1): 238.97 parts, and an aqueous solvent (a mixed solution of NMP and water, a mass ratio=17.83:173.35): 191.18 parts are mixed.

The mixture is dispersed by ultrasonic dispersion at 50° C. for 30 minutes, and thereby a polyimide precursor solution in which the resin particles have been dispersed is obtained. In addition, using the obtained polyimide precursor solution, a porous polyimide film is obtained as follows.

A 1.0 mm-thick stainless steel substrate for forming a coating film of the polyimide precursor solution is prepared. Using an applicator, the polyimide precursor solution is applied to the stainless steel substrate in an area of 10 cm×10 cm such that a film thickness after application and drying becomes 400 µm, and thereby a coating film is obtained. The obtained coating film is dried by heating at 50° C. for 120 minutes (a first step).

Thereafter, a temperature is raised at a rate of 10° C./min, maintained at 200° C. for 60 minutes, and then cooled to room temperature. Then, the coating film is immersed in tetrahydrofuran for 30 minutes to remove resin particles (a second step).

Subsequently, the room temperature (25° C., the same applies hereinafter) is raised at a rate of 10° C./rain, and a temperature is maintained for 60 minutes when the temperature has reached 350° C. (a third step).

Thereafter, the temperature is cooled to room temperature, and thereby a porous polyimide film having a film thickness of 20 µm is obtained.

Example 2

A porous polyimide film is obtained in the same manner as in Example 1 except that the film is dried by heating at 80° C. in the first step, and a temperature is maintained for 60 minutes when the temperature has reached 400° C. in the third step.

Figure 5:
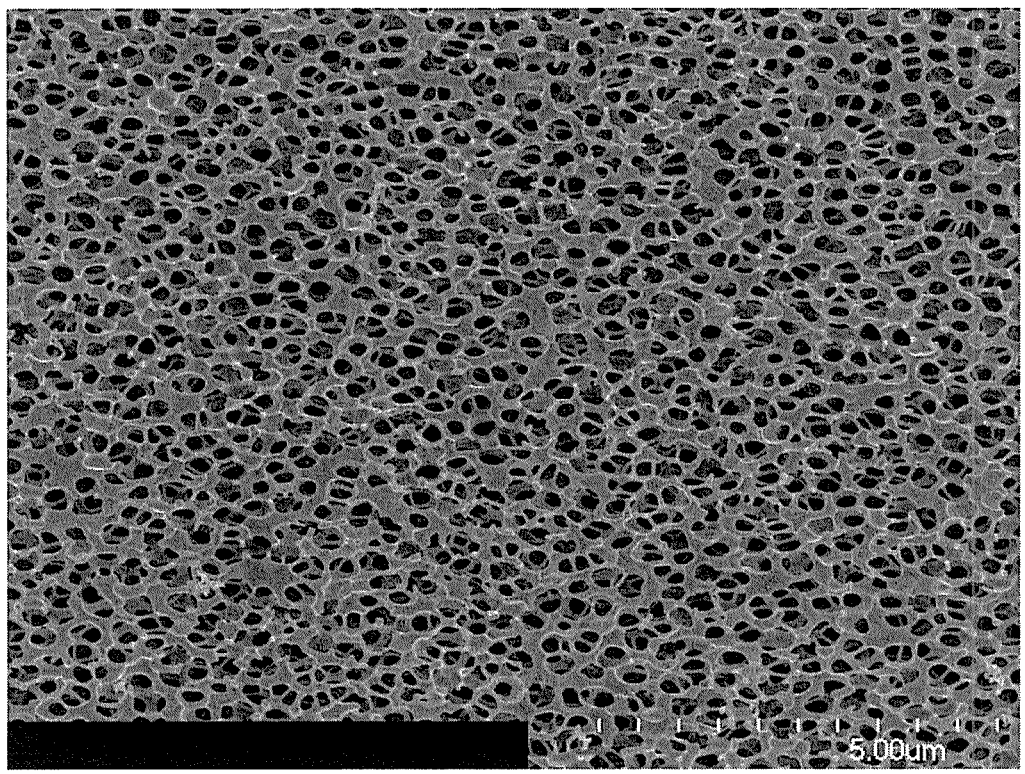
FIG. 5 is a cross-sectional photograph of a porous polyimide film of Example 2.

FIG. 5 is a cross-sectional photograph of the obtained porous polyimide film of Example 2.

Example 3

A porous polyimide film is obtained in the same manner as in Example 1 except that the film is dried by heating at 80° C. in the first step, particles are heated to be removed by maintaining a temperature at 200° C. for 60 minutes and then at 350° C. for 60 minutes in the second step, and a temperature is maintained for 60 minutes when the temperature has reached 400° C. in the third step.

Example 4

A polyimide precursor solution in which resin particles have been dispersed is obtained in the same manner as in Example 1 except that the polyimide-precursor-containing liquid (A): 289.65 parts, the resin particle dispersion (1): 172.41 parts, and an aqueous solvent (a mixed solution of NMP and water, a mass ratio=30.41:107.53):137.94 parts are mixed. In addition, a porous polyimide film is obtained in the same manner as in Example 1 except that a polyimide precursor solution in which the obtained resin particles have been dispersed is used.

Example 5

A polyimide precursor solution in which resin particles have been dispersed is obtained in the same manner as in Example 1 except that the polyimide-precursor-containing liquid (A): 289.65 parts, the resin particle dispersion (1): 172.41 parts, and an aqueous solvent (a mixed solution of NMP and water, a mass ratio=30.41:107.53):137.94 parts are mixed. A porous polyimide film is obtained in the same manner as in Example 1 except that a polyimide precursor solution in which the obtained resin particles have been dispersed is used, the film is dried by heating at 80° C. in the first step, and a temperature is maintained for 60 minutes when the temperature has reached 400° C. in the third step.

Example 6

A polyimide precursor solution in which resin particles have been dispersed is obtained in the same manner as in Example 1 except that the polyimide-precursor-containing liquid (A): 289.65 parts, the resin particle dispersion (1): 172.41 parts, and an aqueous solvent (a mixed solution of NMP and water, a mass ratio=30.41:107.53): 137.94 parts are mixed. A porous polyimide film is obtained in the same manner as in Example 1 except that a polyimide precursor solution in which the obtained resin particles have been dispersed is used, the film is dried by heating at 80° C. in the first step, particles are removed after maintaining a temperature at 200° C. for 10 minutes in the second step, and a temperature is maintained for 60 minutes when the temperature has reached 400° C. in the third step.

Example 7

A polyimide precursor solution in which resin particles have been dispersed is obtained in the same manner as in Example 1 except that the polyimide-precursor-containing liquid (A): 289.65 parts, the resin particle dispersion (1): 172.41 parts, and an aqueous solvent (a mixed solution of NMP and water, a mass ratio=30.41:107.53): 137.94 parts are mixed. A porous polyimide film is obtained in the same manner as in Example 1 except that a polyimide precursor solution in which the obtained resin particles have been dispersed is used, the film is dried by heating at 80° C. in the first step, particles are heated to be removed after maintaining a temperature at 200° C. for 60 minutes and then at 350° C. for 60 minutes in the second step, and a temperature is maintained for 60 minutes when the temperature has reached 400° C. in the third step.

Example 8

A polyimide precursor solution in which resin particles have been dispersed is obtained in the same manner as in Example 1 except that the polyimide-precursor-containing liquid (A): 350.0 parts, the resin particle dispersion (2): 147.1 parts, and an aqueous solvent (a mixed solution of NMP and water, a mass ratio=36.75:66.15):102.9 parts are mixed. In addition, a porous polyimide film is obtained in the same manner as in Example 1 except that a polyimide precursor solution in which the obtained resin particles have been dispersed is used.

Example 9

A polyimide precursor solution in which resin particles have been dispersed is obtained in the same manner as in Example 1 except that the polyimide-precursor-containing liquid (A): 350.0 parts, the resin particle dispersion (2): 147.1 parts, and an aqueous solvent (a mixed solution of NMP and water, a mass ratio=36.75:66.15):102.9 parts are mixed. A porous polyimide film is obtained in the same manner as in Example 1 except that a polyimide precursor solution in which the obtained resin particles have been dispersed is used, the film is dried by heating at 80° C. in the first step, and a temperature is maintained for 60 minutes when the temperature has reached 400° C. in the third step.

Example 10

A polyimide precursor solution in which resin particles have been dispersed is obtained in the same manner as in Example 1 except that the polyimide-precursor-containing liquid (A): 350.0 parts, the resin particle dispersion (2): 147.1 parts, and an aqueous solvent (a mixed solution of NMP and water, a mass ratio=36.75:66.15):102.9 parts are mixed. A porous polyimide film is obtained in the same manner as in Example 1 except that a polyimide precursor solution in which the obtained resin particles have been dispersed is used, the film is dried by heating at 80° C. in the first step, particles are removed after maintaining a temperature at 200° C. for 10 minutes in the second step, and a temperature is maintained for 60 minutes when the temperature has reached 400° C. in the third step.

Figure 6:
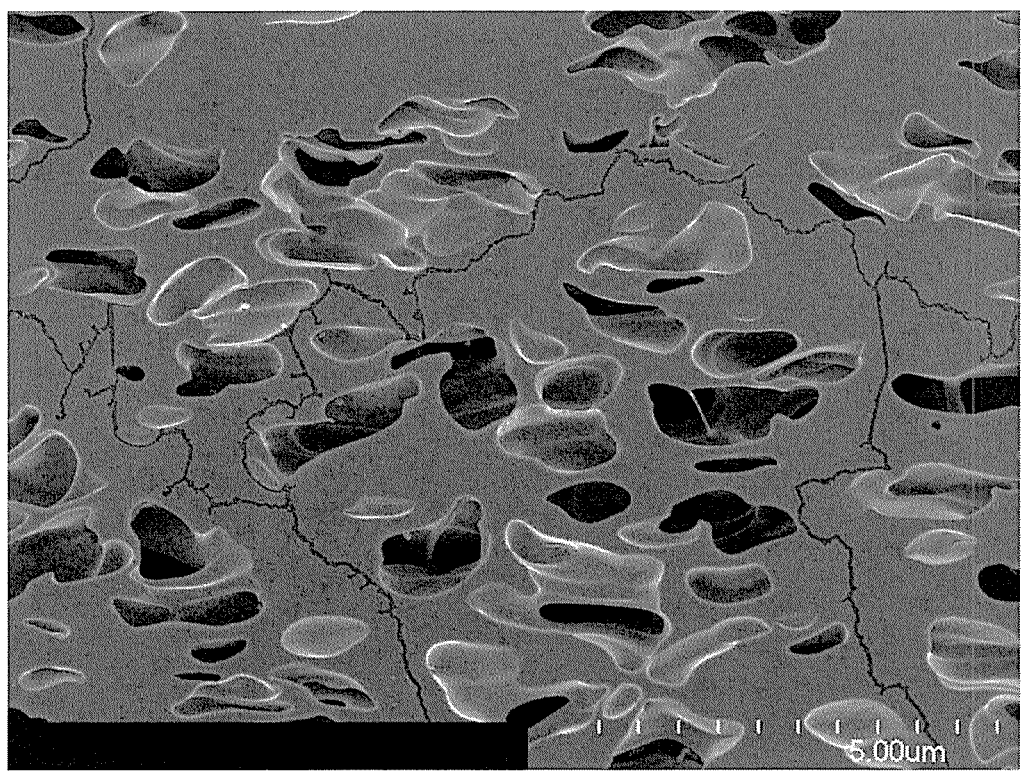
FIG. 6 is a cross-sectional photograph of a porous polyimide film of Example 10.

FIG. 6 is a cross-sectional photograph of the obtained porous polyimide film of Example 10.

Example 11

A polyimide precursor solution in which resin particles have been dispersed is obtained in the same manner as in Example 1 except that the polyimide-precursor-containing liquid (A): 350.0 parts, the resin particle dispersion (2): 147.1 parts, and an aqueous solvent (a mixed solution of NMP and water, a mass ratio=36.75:66.15):102.9 parts are mixed. A porous polyimide film is obtained in the same manner as in Example 1 except that a polyimide precursor solution in which the obtained resin particles have been dispersed is used, the film is dried by heating at 80° C. in the first step, particles are heated to be removed after maintaining a temperature at 200° C. for 60 minutes and then at 350° C. for 60 minutes in the second step, and a temperature is maintained for 60 minutes when the temperature has reached 400° C. in the third step.

Various conditions of Examples 1 to 11 are summarized in Table 1.

TABLE 1

| | | Example 1 | Example 2 | Example 3 | Example 4 | Example 5 | Example 6 |
|---|---|---|---|---|---|---|---|
| Mass ratio | Polyimide-precursor-containing liquid [parts by mass] | 169.85 | 169.85 | 169.85 | 289.65 | 289.65 | 289.65 |
| | Resin particle dispersion [parts by mass] | 238.97 | 238.97 | 238.97 | 172.41 | 172.41 | 172.41 |
| | Aqueous solvent [parts by mass] | 191.18 | 191.18 | 191.18 | 137.94 | 137.94 | 137.94 |
| First step | Drying temperature [° C.] | 50 | 80 | 80 | 50 | 80 | 80 |
| | Drying time [min.] | 120 | 120 | 120 | 120 | 120 | 120 |
| Second step | Heating (pre-imidization) temperature [° C.] | 200 | 200 | 200 | 200 | 200 | 200 |
| | Heating (pre-imidization) time [min.] | 60 | 60 | 60 | 60 | 60 | 10 |
| | Immersion time in THF [min.] | 30 | 30 | — | 30 | 30 | 30 |
| | Particle removal temperature [° C.] | — | — | 350 | — | — | — |
| | Retention time of particle removal temperature [min.] | — | — | 60 | — | — | — |
| Third step | Heating (baking) temperature [° C.] | 350 | 400 | 400 | 350 | 400 | 400 |
| | Temperature rising rate [° C./min.] | 10 | 10 | 10 | 10 | 10 | 10 |
| | Heating (baking) time [min.] | 60 | 60 | 60 | 60 | 60 | 60 |

| | | Example 7 | Example 8 | Example 9 | Example 10 | Example 11 |
|---|---|---|---|---|---|---|
| Mass ratio | Polyimide-precursor-containing liquid [parts by mass] | 289.65 | 350.0 | 350.0 | 350.0 | 350.0 |
| | Resin particle dispersion [parts by mass] | 172.41 | 147.1 | 147.1 | 147.1 | 147.1 |
| | Aqueous solvent [parts by mass] | 137.94 | 102.9 | 102.9 | 102.9 | 102.9 |

TABLE 1-continued

| | | | | | | |
|---|---|---|---|---|---|---|
| First step | Drying temperature [° C.] | 80 | 50 | 80 | 80 | 80 |
| | Drying time [min.] | 120 | 120 | 120 | 120 | 120 |
| Second step | Heating (pre-imidization) temperature [° C.] | 200 | 200 | 200 | 200 | 200 |
| | Heating (pre-imidization) time [min.] | 60 | 60 | 60 | 10 | 60 |
| | Immersion time in THF [min.] | — | 30 | 30 | 30 | — |
| | Particle removal temperature [° C.] | 350 | — | — | — | 350 |
| | Retention time of particle removal temperature [min.] | 60 | — | — | — | 60 |
| Third step | Heating (baking) temperature [° C.] | 400 | 350 | 400 | 400 | 400 |
| | Temperature rising rate [° C./min.] | 10 | 10 | 10 | 10 | 10 |
| | Heating (baking) time [min.] | 60 | 60 | 60 | 60 | 60 |

Comparative Example 1

A porous polyimide film is obtained as follows.

0.3 parts by mass of monodispersed spherical particles of silica having a diameter of 400 nm manufactured by NIPPON SHOKUBAI CO., LTD. are dispersed in 10 parts by mass of pure water, and thereby a suspension is prepared. This suspension is subjected to filtration under reduced pressure using a 100 μm membrane filter so that the particles are closely packed and accumulated on the filter at a thickness of 200 μm. Next, the silica is dried, removed from the filter, and then baked at 1100° C. for 3 hours. The obtained silica sheet is filled with the polyimide-precursor-containing liquid (B), and room temperature is raised to 380° C. at a rate of 10° C./min. The temperature is maintained at 380° C. for 1 hour, and then cooled to room temperature. The obtained silica-containing polyimide film is immersed in a 10% aqueous hydrogen fluoride solution for 12 hours to dissolve and elute the silica, and thereby a porous polyimide film having a film thickness of 20 μm is obtained.

Comparative Example 2

A porous polyimide film is obtained as follows.

59.02 parts by mass of the polyimide-precursor-containing liquid (B) and 40.98 parts by mass of monodispersed spherical particles of silica having a diameter of 600 nm manufactured by NIPPON SHOKUBAI CO., LTD. are mixed. The mixture is dispersed by ultrasonic dispersion at 50° C. for 30 minutes, and thereby a polyimide precursor solution in which the silica particles have been dispersed is obtained.

Using an applicator, the polyimide precursor solution is applied to the stainless steel substrate in an area of 10 cm×10 cm such that a film thickness after application and drying becomes 400 μm, and thereby a coating film is obtained. The obtained coating film is dried by heating at 100° C. for 1 hour, and the temperature is raised to 380° C. at a rate of 10° C./min. The temperature is maintained at 380° C. for 1 hour, and then cooled to room temperature. The obtained silica-containing polyimide film is immersed in a 10% aqueous hydrogen fluoride solution for 12 hours to dissolve and elute the silica, and thereby a porous polyimide film having a film thickness of 20 μm is obtained. The obtained porous polyimide film is crushed in a thickness direction, and thereby a porous polyimide film having a film thickness of 10 μm is obtained.

Measurement and Calculation

With respect to the obtained porous polyimide film, an average flattening, a coefficient of variation of a distance between adjacent pores, a porosity, and an average major axis are obtained by the methods described above.

The results are shown in Table 2.

Evaluation (1) Evaluation of Tensile Breaking Strength

Using the obtained porous polyimide film, a tensile breaking strength is measured by the method described above and evaluated according to the following standard. The results are shown in Table 2.

Evaluation Standard

A: A tensile breaking strength is 30 MPa or more.

B: A tensile breaking strength is 20 MPa or more and less than 30 MPa.

C: A tensile breaking strength is less than 20 MPa (2) Evaluation of Air Permeability A sample for measurement of air permeability is prepared from the obtained porous polyimide film according to an air permeability test method of the Gurley method (JIS P 8117:2009). Using the obtained sample for measurement, air permeability is measured by the method described above. The results are shown in Table 2.

(3) Evaluation of Cycle Characteristics

A lithium-ion secondary battery is produced using the porous polyimide film as a separator. Using the obtained secondary battery, a reduction percentage of a battery capacity when the battery is repeatedly charged and discharged 500 times (1C charge and 1C discharge at 25° C.) is examined. It can be said that as a reduction percentage of a battery capacity becomes small, cycle characteristics become favorable. The results are shown in Table 2.

Evaluation Standard

A: A reduction percentage of a battery capacity is less than 20% (favorable)

B: A reduction percentage of a battery capacity is 20% or more (poor)

TABLE 2

| | Example 1 | Example 2 | Example 3 | Example 4 | Example 5 | Example 6 | Example 7 |
|---|---|---|---|---|---|---|---|
| Average flattening | 0.1 | 0.2 | 0.2 | 0.2 | 0.3 | 0.5 | 0.4 |
| Coefficient of variation of distance between adjacent pores | 0.1 | 0.3 | 0.3 | 0.1 | 0.3 | 0.4 | 0.3 |
| Porosity [%] | 75 | 74 | 72 | 59 | 56 | 53 | 54 |
| Average major axis of pores [nm] | 400 | 400 | 400 | 400 | 400 | 400 | 400 |

TABLE 2-continued

| | | | | | | | |
|---|---|---|---|---|---|---|---|
| Tensile breaking strength [MPa] | B | A | A | A | A | A | A |
| Air permeability [sec./100 mL] | 28 | 33 | 38 | 70 | 73 | 79 | 73 |
| Cycle characteristics | A | A | A | A | A | A | A |

| | Example 8 | Example 9 | Example 10 | Example 11 | Comparative Example 1 | Comparative Example 2 |
|---|---|---|---|---|---|---|
| Average flattening | 0.2 | 0.4 | 0.6 | 0.4 | 0 | 0.8 |
| Coefficient of variation of distance between adjacent pores | 0.2 | 0.3 | 0.4 | 0.3 | 0 | 0.5 |
| Porosity [%] | 48 | 46 | 45 | 46 | 75 | 43 |
| Average major axis of pores [nm] | 800 | 800 | 800 | 800 | 400 | 600 |
| Tensile breaking strength [MPa] | A | A | A | A | C | A |
| Air permeability [sec./100 mL] | 132 | 138 | 143 | 136 | 20 | 465 |
| Cycle characteristics | A | A | A | A | A | B |

Based on the results shown in Table 2, it can be seen that the porous polyimide film obtained in this example has a high tensile breaking strength and a high air permeability.

In addition, it can be seen that the porous polyimide film obtained in this example has excellent cycle characteristics.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A porous polyimide film comprising:
the porous polyimide film has a plurality of pores, an average flattening of the plurality of pores is within a range of 0.1 to 0.7, a coefficient of variation of a distance between adjacent pores is within a range of 0.10 to 0.40, and a front surface and a back surface communicate with each other through the plurality of pores.

2. The porous polyimide film according to claim 1, wherein the average flattening is within a range of 0.2 to 0.7.

3. The porous polyimide film according to claim 1, wherein a porosity of the porous polyimide film is within a range of 45% to 85%.

4. The porous polyimide film according to claim 1, wherein an average major axis of the plurality of pores is within a range of 50 nm to 1,500 nm.

5. The porous polyimide film according to claim 1, wherein a tensile breaking strength of the porous polyimide film is 20 MPa or more.

6. The porous polyimide film according to claim 1, wherein an air permeability is 300 seconds/100 mL or less.

7. The porous polyimide film according to claim 6, wherein the air permeability is 270 seconds/100 mL or less.

8. A secondary battery separator comprising the porous polyimide film according to claim 1.

9. A secondary battery comprising the secondary battery separator according to claim 7.

* * * * *